(12) United States Patent
Raab et al.

(10) Patent No.: US 9,346,484 B2
(45) Date of Patent: May 24, 2016

(54) APPARATUS FOR RELEASING A SECURING SCREW FOR A UNIT IN A HOUSING

(75) Inventors: Andreas Raab, Neuler (DE); Andreas Stahl, Bopfingen (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 211 days.

(21) Appl. No.: 14/131,349

(22) PCT Filed: Jul. 11, 2012

(86) PCT No.: PCT/EP2012/063537
§ 371 (c)(1),
(2), (4) Date: Feb. 5, 2014

(87) PCT Pub. No.: WO2013/010863
PCT Pub. Date: Jan. 24, 2013

(65) Prior Publication Data
US 2014/0144264 A1   May 29, 2014

(30) Foreign Application Priority Data
Jul. 20, 2011   (DE) .......................... 10 2011 051 960

(51) Int. Cl.
| | | |
|---|---|---|
| B25B 23/00 | (2006.01) | |
| B62D 3/06 | (2006.01) | |
| F16C 35/067 | (2006.01) | |
| F16B 39/32 | (2006.01) | |
| F16B 23/00 | (2006.01) | |

(52) U.S. Cl.
CPC .............. *B62D 3/06* (2013.01); *F16B 23/0069* (2013.01); *F16B 39/32* (2013.01); *F16C 35/067* (2013.01); *F16B 23/00* (2013.01); *F16C 2226/60* (2013.01); *Y10T 74/18704* (2015.01)

(58) Field of Classification Search
CPC ....... B62D 3/06; F16B 39/32; F16B 23/0069; F16B 23/00; F16C 35/067
USPC ...................................... 81/459–461
See application file for complete search history.

(56) References Cited

U.S. PATENT DOCUMENTS

| | | | | |
|---|---|---|---|---|
| 1,153,488 | A | * | 9/1915 | Hallowell ................ B21K 1/46 470/10 |
| 2,730,454 | A | * | 1/1956 | Sommer ................ C08L 95/00 106/284.4 |

(Continued)

FOREIGN PATENT DOCUMENTS

| | | |
|---|---|---|
| DE | 39 35 753 | 5/1990 |
| DE | 10 2004 017 259 | 11/2004 |

(Continued)

*Primary Examiner* — Hadi Shakeri
*Assistant Examiner* — Danny Hong
(74) *Attorney, Agent, or Firm* — Jordan and Hamburg LLP

(57) ABSTRACT

In a device for releasing a securing screw for a unit in a housing, in particular a pinion unit in a steering gear of a motor vehicle, the securing screw is connected via an external thread to an internal thread in the housing, wherein the securing screw is provided with a latching device, which has latching levers disposed distributed on the circumference of the securing screw, each of which said latching levers is provided with latching lugs disposed on the free ends of the latching levers. The latching lugs latch into teething gaps of a teething geometry of the housing. The latching devices can be connected to a tool in order to release the latching levers having the latching lugs from the latched position by means of a radially inwardly directed movement of the latching levers.

6 Claims, 5 Drawing Sheets

(56) References Cited

U.S. PATENT DOCUMENTS

| | | | | |
|---|---|---|---|---|
| 4,978,265 | A * | 12/1990 | De Wan | F16B 13/005 411/182 |
| 6,119,306 | A * | 9/2000 | Antonucci | E05F 5/022 16/86 A |
| 6,217,269 | B1 * | 4/2001 | Jentzen | B65D 41/0471 411/296 |
| 6,507,976 | B2 * | 1/2003 | Ichimaru | E05F 5/022 16/2.1 |
| 7,090,454 | B2 * | 8/2006 | Shain | F16B 37/00 411/190 |
| 8,056,965 | B2 * | 11/2011 | Rosemann | E05F 5/022 16/86 A |
| 2005/0220569 | A1 * | 10/2005 | Dryer | F16B 39/32 411/553 |

FOREIGN PATENT DOCUMENTS

| | | |
|---|---|---|
| DE | 10 2008 001 193 | 10/2009 |
| DE | 10 2010 008 404 | 8/2011 |
| EP | 2 354 481 | 8/2011 |
| FR | 2 853 383 | 10/2004 |
| GB | 191316625 | 0/1913 |
| WO | WO-2009/001421 | 12/2008 |

\* cited by examiner

APPARATUS FOR RELEASING A SECURING SCREW FOR A UNIT IN A HOUSING

BACKGROUND OF THE INVENTION

The invention relates to a device for releasing a securing screw for a unit in a housing, in particular a pinion in a steering gear of a motor vehicle.

Known positional securings are implemented via bolted connections, e.g. steel screws, having a metric thread. The screw lock is achieved in a force-locking manner via a tightening torque, via caulking, or via an adhesive joint. In known securings, a bearing, for example, is fixed with the aid of a zinc die-cast adjusting screw, for example, which is fixed in the position thereof according to a defined tightening torque with the aid of a caulking process.

The use of materials having different coefficients of thermal expansion poses a problem, however, whereby the securing effect diminishes over the service life and/or play may even result. The setting properties of the material of the adjusting screw relative to the housing material also negatively affect securing or fixation. It is also disadvantageous that the adjusting screw must be fixed in the position thereof in the housing in a separate working cycle. Given that the preload of the adjusting screw may decrease to zero over the course of the service life, it is possible for play to form between the unit to be secured, e.g. a fixed bearing, and the adjusting screw or the housing. The result thereof is frictional wear, and acoustic problems can occur.

A thread sealing agent is often used for sealing against external media, which also increases the complexity of the manufacturing and/or assembly process.

The problem addressed by the present invention is therefore that of creating a low-cost and easily assembled device for securing a unit, wherein play-free fixation should be given throughout the service life and the securing can be released, if necessary.

SUMMARY OF THE INVENTION

Due to the embodiment of the securing device according to the invention having a securing screw, which is provided with latching levers, wherein the securing screw works together via the external thread thereof with an internal thread in the housing and latching lugs of the latching levers can engage in the housing, it is ensured that absence of play and, therefore, secure fixation of the unit, e.g. a fixed bearing, is achieved even given different coefficients of thermal expansion.

A tool, which can be connected to the latching device, is provided in order to release the latching lugs of the latching levers from the latched position via a radially inwardly directed movement of the latching levers, wherein the tool is used to inwardly displace the latching levers, after which the securing screw can be released.

According to an advantageous embodiment for releasing the latching levers from the latched position, the outer circumferential wall in each of the toothing gaps is provided with an inwardly directed bevel. The latching levers are swivelled radially inwardly along the bevel.

To this end, it can be further provided that each of the latching lugs is provided with a chamfer or bevel on the outer circumference on the underside thereof, by means of which the release and inward swivelling of the latching levers is simplified.

According to an advantageous embodiment of the invention, the securing screw is designed, at least in the region of the latching device, as a hollow screw in the form of a polygon, into which the tool can be inserted for releasing.

Due to an embodiment of this type, it is only necessary to insert the tool into the polygon and then press the tool axially onto the latching levers, whereupon the latching levers are released from the toothing geometry due to the inwardly directed bevel.

Particularly advantageously, the invention can be used in the case in which the securing screw is produced from a plastic body.

Further advantageous embodiments and developments will become apparent from the exemplary embodiment described in principle with the aid of the drawings.

DESCRIPTION OF THE PREFERRED EMBODIMENTS

Figure 1:
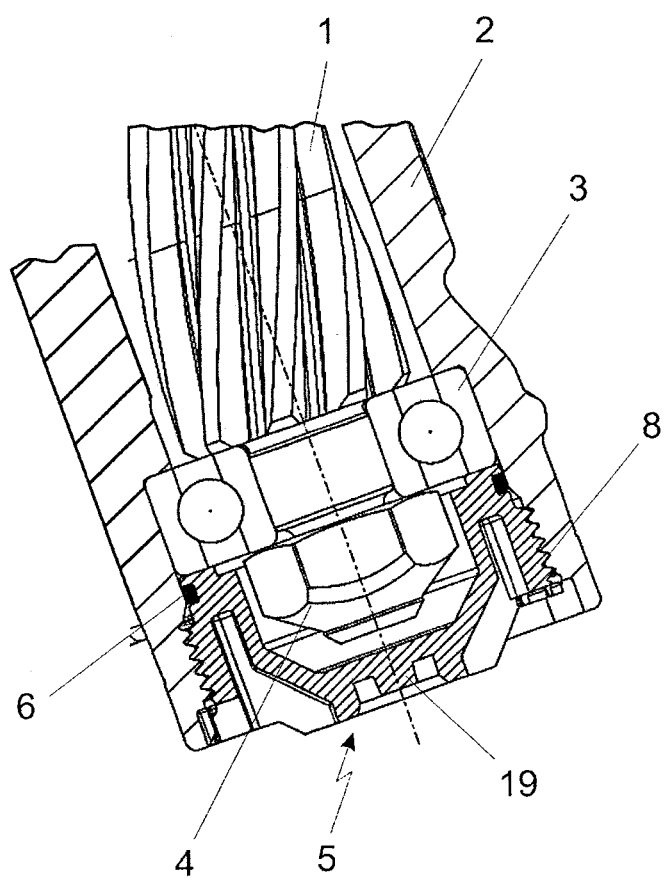
FIG. 1 shows a section of a steering gear of a motor vehicle having the support and securing of the pinion according to the invention by means of a securing screw.
Figure 2:
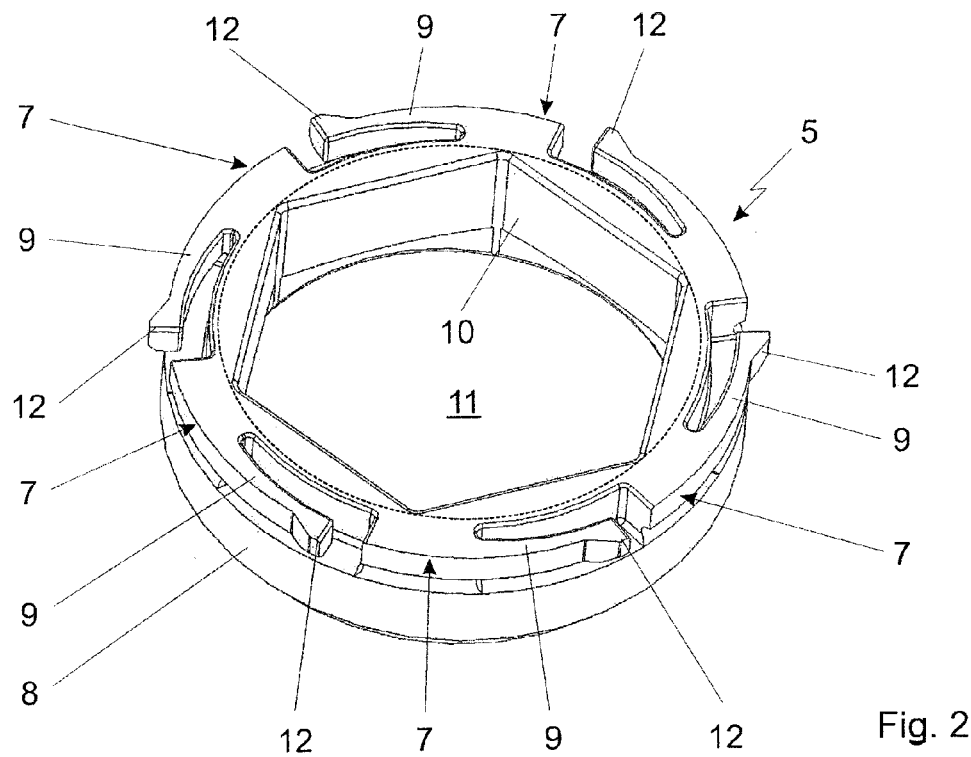
FIG. 2 shows a three-dimensional representation of the device according to the invention comprising the securing screw and a latching device.
Figure 3:
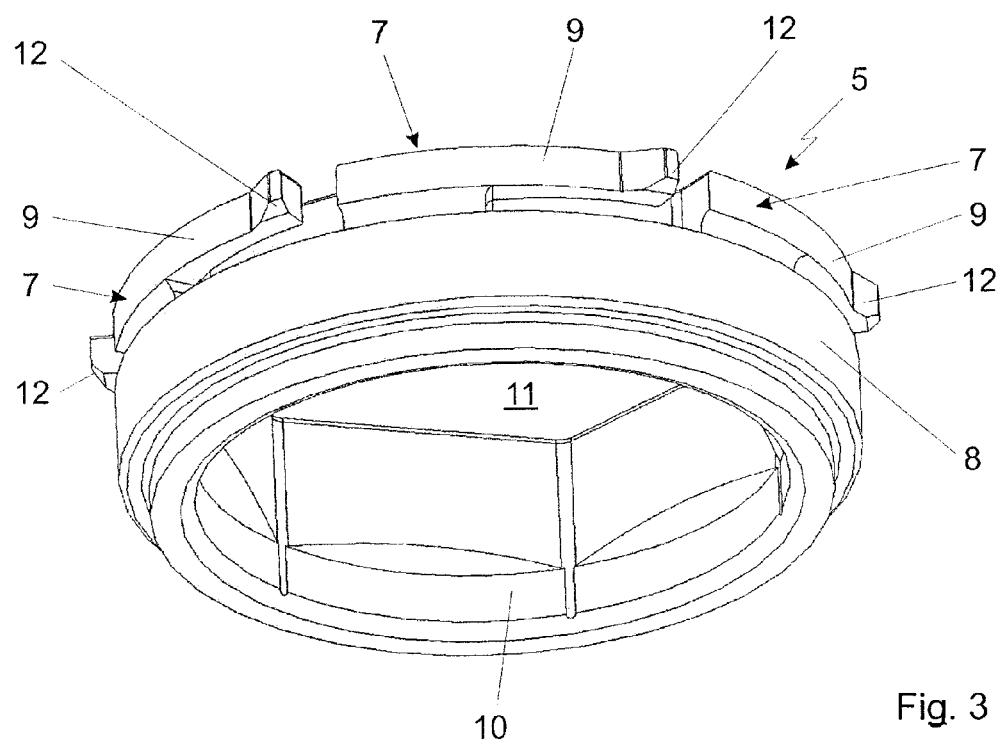
FIG. 3 shows a three-dimensional representation of the device according to the invention comprising the securing screw and a latching device in a view from below.
Figure 4:
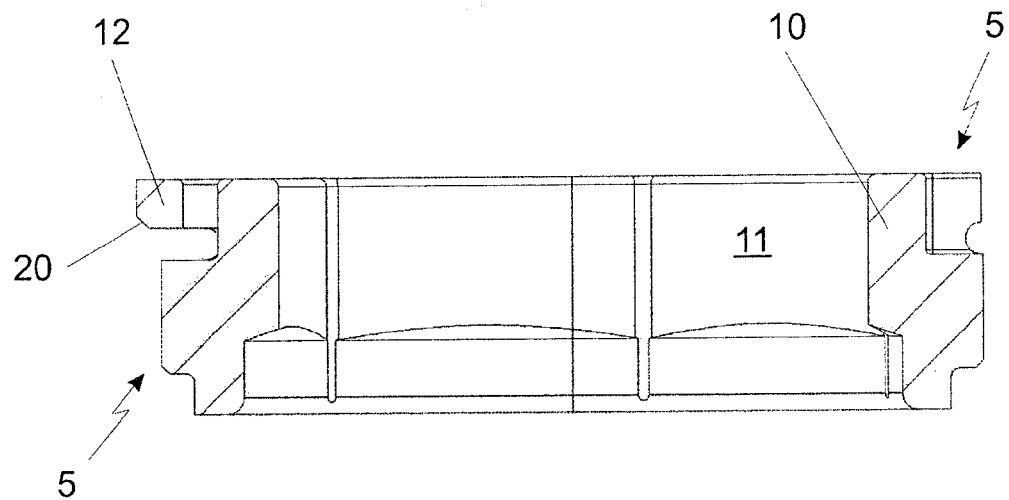
FIG. 4 shows an axial cross section of the device according to the invention.

The invention is described in the following using the example of a use of the device with a securing screw in a steering gear of a motor vehicle, wherein a pinion is supported in a gearbox housing via a fixed bearing.

Of course, however, the device according to the invention can be used in highly diverse fields in which a low-cost, reliable, and easily assembled securing device for a bearing, a guidance sleeve, a bearing sleeve, a gearwheel, or any other type of gearbox part, an adjusting screw for a thrust member for a rack in a steering gear and similar applications is desired, and in which a device is to be provided for releasing the securing screw as necessary.

Since steering gears for motor vehicles comprising a pinion and a rack are generally known, for the purpose of which reference is made to DE 10 2004 017 259 A1, for example, only the parts that are essential to the invention will be discussed in greater detail in the following.

A pinion 1 is supported in a gearbox housing 2 via a fixed bearing 3. The pinion is connected, in a known manner, to a steering wheel (not illustrated) and a rack, which is also not illustrated, in order to convert rotational motion into linear motion. A nut 4 screwed onto the pinion hub is used to secure the pinion 1 to the internal ring of the fixed bearing 3.

According to the invention, a securing screw 5 comprising a plastic body as a hollow screw is provided in order to secure and fix the external ring of the fixed bearing 3.

A sealing ring 6 in an annular groove of the securing screw 5 performs a sealing function.

Axial forces resulting via the pinion 1 and the fixed bearing 3 must be absorbed without play. The forces are therefore introduced into the gearbox housing 2 via the self-locking external thread 8 of the securing screw 5.

The screw lock is formed by a radially adjusting latching device 7. The latching device for the securing screw 5 comprises, on the circumference thereof, a plurality of latching levers 9, which are connected to a central piece 10 of the securing screw 5 in the region of an end of the latching lever 9 in each case. The central piece 10 of the securing screw 5 has a hexagonal bore 11. In the exemplary embodiment, six latching levers 9 are disposed distributed around the circumference. Other numbers thereof are also possible within the scope of the invention, of course.

Figure 5:
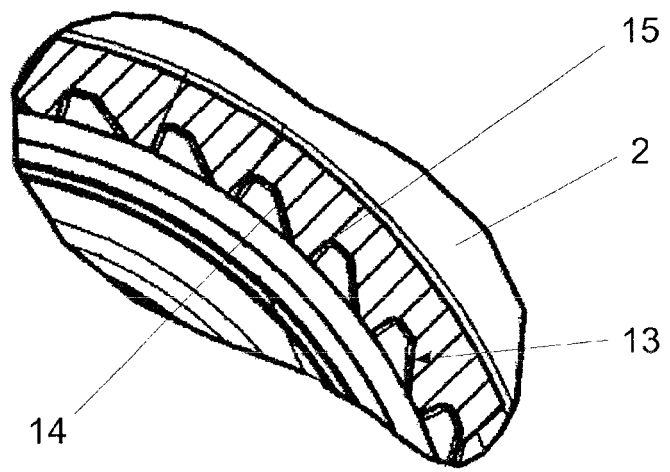
FIG. 5 shows a section of an enlargement of the toothing geometry in the housing of the steering gear for the latching levers of the securing screw.

The latching levers 9 of the latching device 7 are provided with latching lugs 12 on the free ends thereof. The latching lugs 12 of the latching levers 9 latch in a toothing geometry 13 in the gearbox housing 2 (see, in particular, the enlarged depiction of the toothing geometry in FIG. 5). The latching of the latching lugs 12 into the toothing geometry 13 of the gearbox housing 2 prevents the securing screw 5 from becoming unscrewed on its own.

As the securing screw 5 is screwed into the gearbox housing 2, the latching levers 9 are deflected radially and, when the predetermined torque is reached, these latching levers latch into toothing gaps 14 of the toothing geometry 13. The securing screw 5 is prevented from rotating in the reverse direction via the sawtooth-shaped contour of the toothing geometry 13. To this end, the latching lugs 12 bear against contact surfaces 15 in the toothing gaps 14 of the toothing geometry 13.

The securing screw 5, in the embodiment comprising a plastic body, can be made of a fiber-reinforced thermoplastic as an injection-molded part, for example, which is characterized by temperature-resistant behavior.

Figure 6:
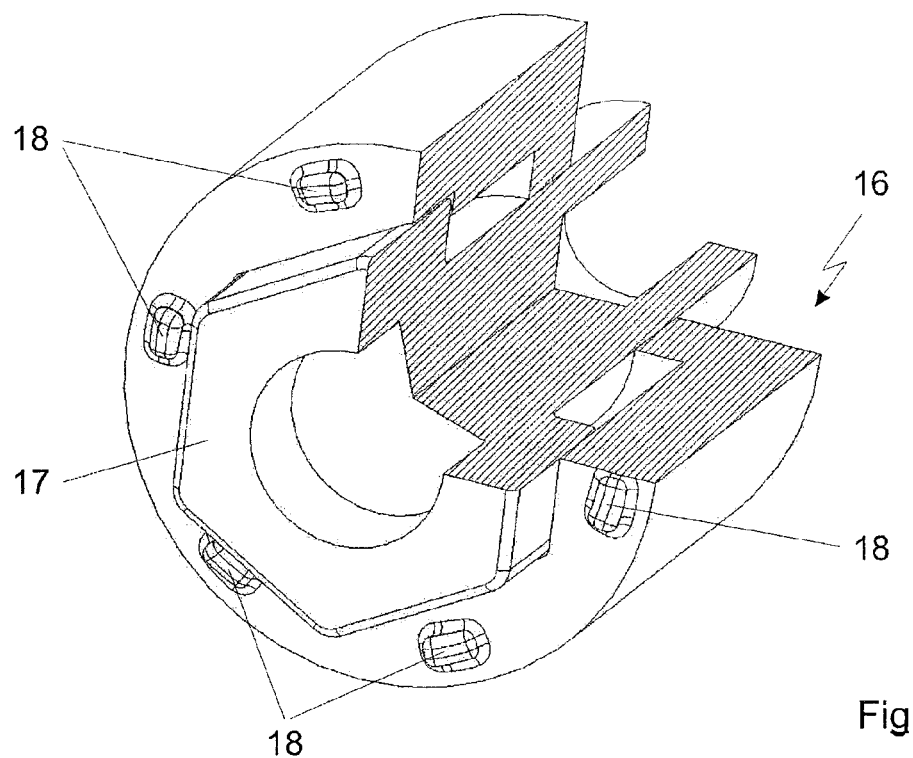
FIG. 6 shows the tool according to the invention for releasing the securing screw, in a three-dimensional representation (partially in cross section)

FIG. 6 shows a tool 16 for releasing the securing screw 5. To this end, the tool 16 has a projection having a hexagonal shape 17. The hexagonal shape 17 corresponds to the hexagonal bore 11 in the securing screw 5, thereby enabling the tool to be connected to the securing screw 5 in an exact and flush manner.

If the securing screw 5 has a polygonal bore that differs from a hexagonal bore 11, the projection of the tool 16 is oriented accordingly to this polygonal bore.

Projections or plungers 18 are located on the end face of the tool 16 facing the securing screw 5, the number of which also corresponds to the number of latching levers 9 of the securing screw 5.

Figure 7:
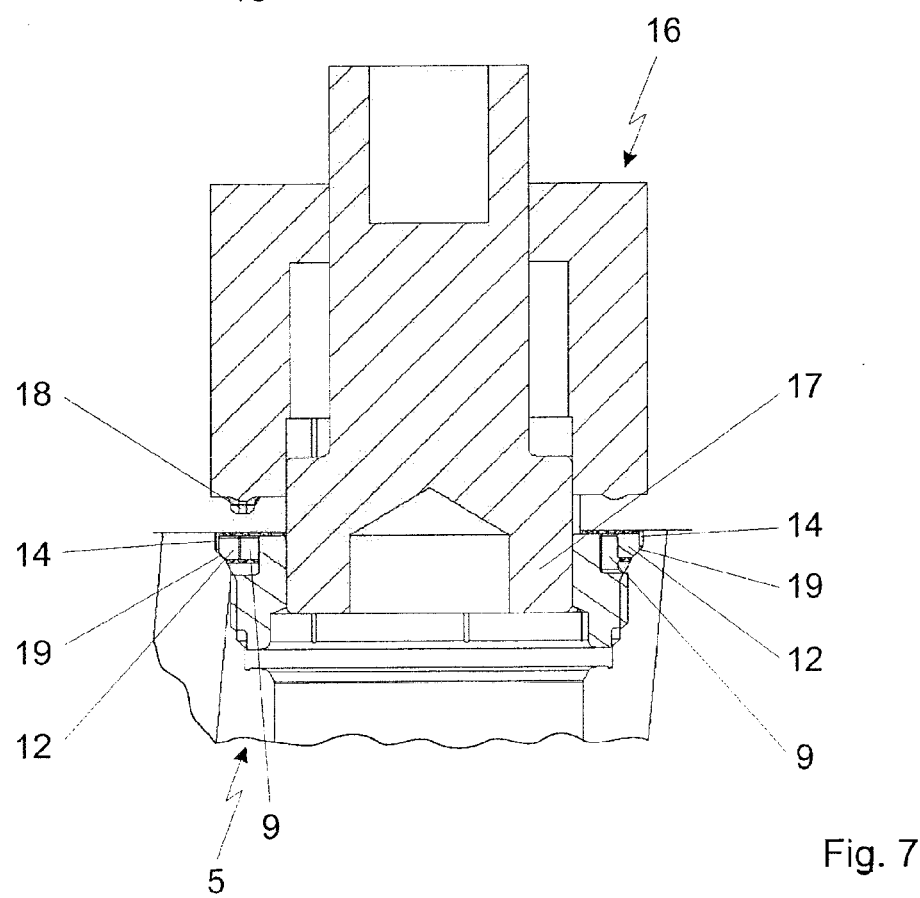
FIG. 7 shows a longitudinal cross section of the tool shortly before placement onto the latching levers.
Figure 8:
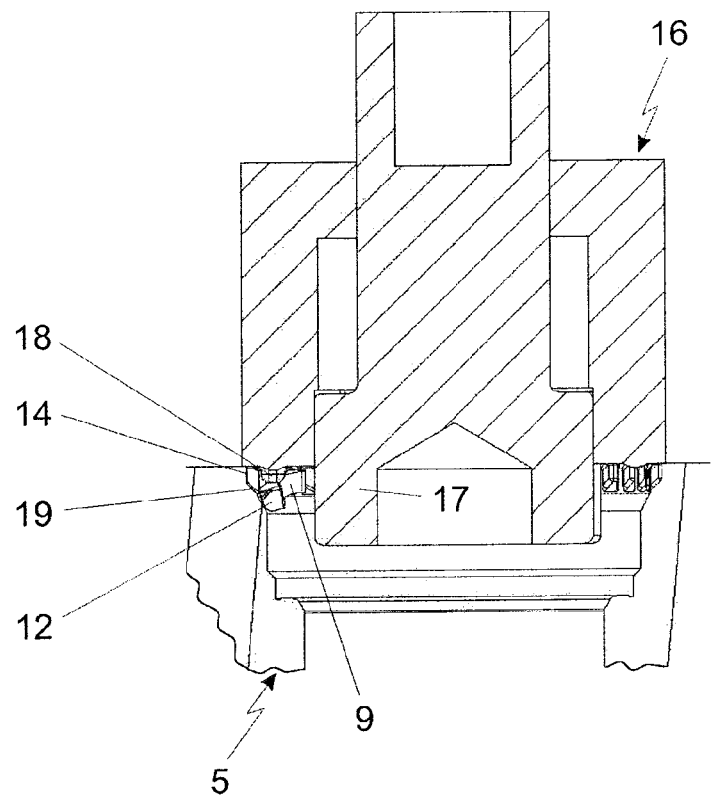
FIG. 8 shows a longitudinal cross section of the tool, wherein the latching lugs are pressed downwardly and radially inwardly by the tool.
Figure 9:
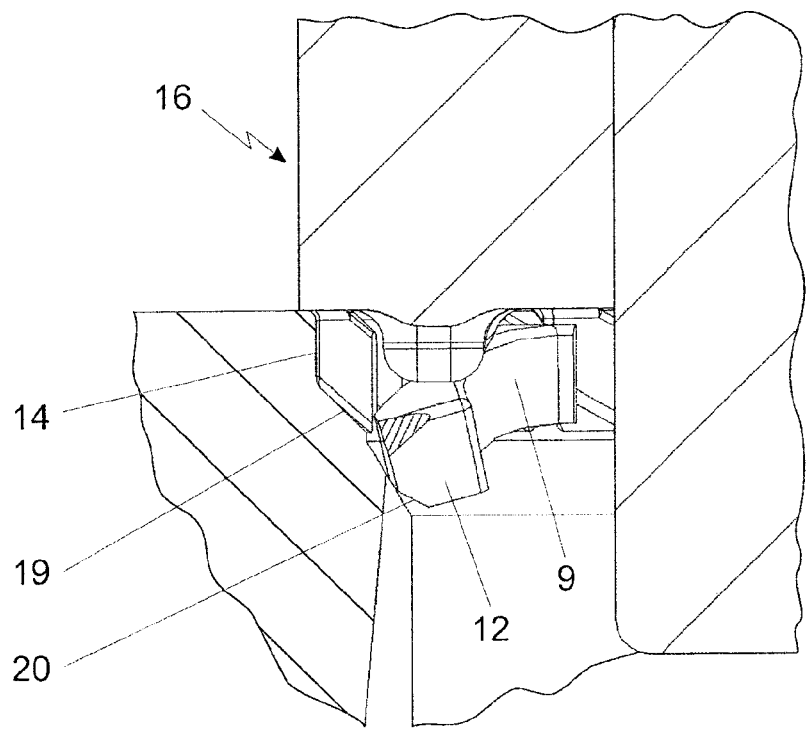
FIG. 9 shows a section of an enlarged representation of FIG. 8 having a downwardly and radially inwardly pressed latching lug.

The mode of operation of the tool 16 for releasing the latching lugs 12 from the toothing geometry 13 of the gearbox housing 2 is illustrated in FIGS. 7 to 9.

FIG. 7 shows how the tool 16 is inserted via the projection thereof 17 into the hexagonal bore 11 of the securing screw 5. The plungers 18 are not yet in contact with the latching levers 9, however.

FIG. 8 shows how the tool 16 presses onto the latching levers 9 via the plungers 18 as the tool is slid further into the hexagonal bore 11. As shown, the outer circumferential walls 19 in the toothing gaps 14 are provided with an inwardly directed bevel in the lower regions of the circumferential walls. If the tool 16 then presses onto the latching levers 9 via the plungers 18, the latching lugs 12 and, therefore, the latching levers 9, are pressed downwardly and inwardly in the direction toward the longitudinal axis of the securing screw 5 and therefore disengage from the toothing geometry 13. The securing screw 5 can then be unscrewed in order to be released from the threaded connection with the gearbox housing 2.

In order to make it easier to press the latching lugs 12 out of the toothing gaps 14, the latching lugs 12 can also each be provided with a chamfer 20 or bevel on the outer circumference on the undersides of the latching lugs (see the enlarged representation in FIG. 9).

The thread of the plastic body of the securing screw 5 can be designed as a metric V-thread, wherein the flank diameter of the thread is designed such that only slight thread play is present.

Other thread shapes are also possible within the scope of the invention, of course, such as a conical thread, for example. The internal toothing in the gearbox housing 2 and the toothing geometry 13 can be ready cast.

The invention was described by reference to a securing screw for a pinion unit in a steering gear of a motor vehicle, but this may of course also be used in other fields, wherein the intention is for a securing screw to be releasable. This relates, for example, to securing screws for all types of bearings, for gearwheels, shafts, and the like.

In place of releasing a securing screw, the device according to the invention can also be used, of course, to release any type of parts or devices from a latched position.

LIST OF REFERENCE CHARACTERS

1 pinion
2 gearbox housing
3 fixed bearing
4 nut
5 securing screw
6 sealing ring
7 latching device
8 external thread
9 latching lever
10 central piece
11 hexagonal shape
12 latching lug
13 toothing geometry
14 toothing gaps
15 contact surface
16 tool
17 projection/hexagonal shape
18 plunger
19 bevel
20 chamfer

The invention claimed is:

1. A device for releasing a securing screw for a pinion unit in a steering gear housing of a motor vehicle, wherein the securing screw is connected via an external thread to an internal thread in the housing, the device comprising:
  a latching device; and
  a tool configured to contact the latching device;
  wherein the latching device comprises a plurality of latching levers that are deflectable and that are formed as part of the securing screw, each one of the plurality of latching levers extending circumferentially about the securing screw at a common axial position of the securing screw at an end of the securing screw;

wherein each one latching lever of the plurality of latching levers has a latching lug at a free end of said one latching lever;

wherein the latching lug latches into a toothing gap of a toothing geometry of the housing to achieve a latched position of the securing screw relative to the housing, and wherein the tool is configured to deflect said each one latching lever in a direction transverse to a longitudinal length of said one latching lever so that said one latching lever is deflected in an axially-downward and radially-inward direction relative to a longitudinal axis of said securing screw and housing to release said each one latching lever from the latched position; and wherein the outer circumferential wall in each of the toothing gaps is provided with an inwardly directed bevel.

2. The device according to claim 1, wherein each of the latching lugs is provided with a chamfer or bevel on the outer circumference on an underside thereof.

3. The device according to claim 1, wherein at least a region of the securing screw including the latching device is hollow and has a polygon shape, and wherein the tool is configured so as to be inserted into said hollow for positioning the tool for releasing the latching levers.

4. The device according to claim 3,
wherein said plurality of latching levers comprise a number of latching levers;
wherein said polygon has a number of corners; and
wherein the number of corners of the polygon corresponds to the number of latching levers.

5. The device according to claim 1, wherein the securing screw, including the plurality of latching levers and corresponding latching lugs, is formed from a plastic body.

6. The device of claim 1, wherein the tool comprises a projection configured to contact said one latching lever to deflect said one latching lever so that said latching lug unlatches from the toothing gap of the toothing geometry of the housing to achieve an unlatched position of the securing screw relative to the housing.

* * * * *